(12) United States Patent
Neuhauser et al.

(10) Patent No.: US 10,366,685 B2
(45) Date of Patent: *Jul. 30, 2019

(54) AUDIO PROCESSING TECHNIQUES FOR SEMANTIC AUDIO RECOGNITION AND REPORT GENERATION

(71) Applicant: The Nielsen Company (US), LLC, New York, NY (US)

(72) Inventors: Alan Neuhauser, Silver Spring, MD (US); John Stavropoulos, Edison, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/728,775

(22) Filed: Oct. 10, 2017

(65) Prior Publication Data

US 2018/0033416 A1 Feb. 1, 2018

Related U.S. Application Data

(63) Continuation of application No. 14/885,216, filed on Oct. 16, 2015, now Pat. No. 9,812,109, which is a
(Continued)

(51) Int. Cl.
*G10L 25/00* (2013.01)
*G10H 1/40* (2006.01)
(Continued)

(52) U.S. Cl.
CPC .............. *G10H 1/40* (2013.01); *G06F 17/28* (2013.01); *G10L 15/1815* (2013.01);
(Continued)

(58) Field of Classification Search
CPC ................................ G10L 25/03; G10L 25/60
(Continued)

(56) References Cited

U.S. PATENT DOCUMENTS 2,662,168 A 12/1953 Scherbatskoy
3,919,479 A 11/1975 Moon et al.
(Continued)

FOREIGN PATENT DOCUMENTS

EP 0887958 12/1998
WO 9111062 7/1991
(Continued)

OTHER PUBLICATIONS

Bellettini, et al., "A Framework for Robust Audio Fingerprinting," Journal of Communications, vol. 5, No. 5, Academy Publisher, May 2010, 16 pages.
(Continued)

*Primary Examiner* — Daniel Abebe
(74) *Attorney, Agent, or Firm* — Hanley, Flight & Zimmerman, LLC

(57) ABSTRACT

Example apparatus, articles of manufacture and methods to determine semantic audio information for audio are disclosed. Example methods include extracting a plurality of audio features from the audio, at least one of the plurality of audio features including at least one of a temporal feature, a spectral feature, a harmonic feature, or a rhythmic feature. Example methods also include comparing the plurality of audio features to a plurality of stored audio feature ranges having tags associated therewith. Example methods further include determining a set of ranges of the plurality of stored audio feature ranges having closest matches to the plurality of audio features, a tag associated with the set of ranges having the closest matches to be used to determine the semantic audio information for the audio.

15 Claims, 7 Drawing Sheets

Related U.S. Application Data continuation of application No. 13/724,836, filed on Dec. 21, 2012, now Pat. No. 9,195,649.

(51) Int. Cl.
  *G06F 17/28* (2006.01)
  *G10L 19/018* (2013.01)
  *G10L 15/18* (2013.01)

(52) U.S. Cl.
  CPC ...... *G10L 19/018* (2013.01); *G10H 2210/036* (2013.01); *G10H 2210/066* (2013.01); *G10H 2210/071* (2013.01); *G10H 2210/076* (2013.01); *G10L 15/1822* (2013.01)

(58) Field of Classification Search
  USPC ........................................................ 704/243
  See application file for complete search history.

(56) References Cited

U.S. PATENT DOCUMENTS

| | | |
|---|---|---|
| 4,230,990 A | 10/1980 | Lert, Jr. et al. |
| 4,450,531 A | 5/1984 | Kenyon et al. |
| 4,677,466 A | 6/1987 | Lert, Jr. et al. |
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,955,070 A | 9/1990 | Welsh et al. |
| 5,436,653 A | 7/1995 | Ellis et al. |
| 5,450,490 A | 9/1995 | Jensen et al. |
| 5,457,768 A | 10/1995 | Tsuboi et al. |
| 5,512,933 A | 4/1996 | Wheatley et al. |
| 5,574,962 A | 11/1996 | Fardeau et al. |
| 5,579,124 A | 11/1996 | Aijala et al. |
| 5,581,800 A | 12/1996 | Fardeau et al. |
| 5,594,934 A | 1/1997 | Lu et al. |
| 5,612,729 A | 3/1997 | Ellis et al. |
| 5,764,763 A | 6/1998 | Jensen et al. |
| 5,787,334 A | 7/1998 | Fardeau et al. |
| 5,918,223 A | 6/1999 | Blum et al. |
| 6,201,176 B1 | 3/2001 | Yourlo |
| 6,574,594 B2 | 6/2003 | Pitman et al. |
| 6,604,072 B2 | 8/2003 | Pitman et al. |
| 6,675,174 B1 | 1/2004 | Bolle et al. |
| 6,871,180 B1 | 3/2005 | Neuhauser et al. |
| 6,968,564 B1 | 11/2005 | Srinivasan |
| 6,973,574 B2 | 12/2005 | Mihcak et al. |
| 6,990,453 B2 | 1/2006 | Wang et al. |
| 7,003,515 B1 | 2/2006 | Glaser et al. |
| 7,031,921 B2 | 4/2006 | Pitman et al. |
| 7,091,409 B2 | 8/2006 | Li et al. |
| 7,174,293 B2 | 2/2007 | Kenyon et al. |
| 7,280,964 B2 | 10/2007 | Wilson et al. |
| 7,284,255 B1 | 10/2007 | Apel et al. |
| 7,532,943 B2 | 5/2009 | Weare |
| 7,582,823 B2 | 9/2009 | Kim et al. |
| 7,634,406 B2 | 12/2009 | Li et al. |
| 7,640,141 B2 | 12/2009 | Kolessar et al. |
| 7,647,604 B2 | 1/2010 | Ramaswamy |
| 7,783,489 B2 | 8/2010 | Kenyon et al. |
| 7,982,117 B2 | 7/2011 | Alcalde et al. |
| 8,140,331 B2 | 3/2012 | Lou |
| 8,244,531 B2 | 8/2012 | Erhart et al. |
| 8,612,441 B2 * | 12/2013 | Wood ............... G06F 17/30247 705/342 |
| 8,769,294 B2 | 7/2014 | Samari et al. |
| 8,825,188 B2 | 9/2014 | Stone et al. |
| 8,892,565 B2 | 11/2014 | Xu et al. |
| 8,959,016 B2 | 2/2015 | McKenna et al. |
| 8,989,503 B2 * | 3/2015 | Kumar ............... G06K 9/00751 345/581 |
| 9,640,156 B2 | 5/2017 | Neuhauser et al. |
| 9,754,569 B2 | 9/2017 | Neuhauser et al. |
| 9,812,109 B2 | 11/2017 | Neuhauser et al. |
| 2002/0181711 A1 | 12/2002 | Logan et al. |
| 2003/0033145 A1 | 2/2003 | Petrushin |
| 2005/0177361 A1 | 8/2005 | Srinivasan |
| 2005/0232411 A1 | 10/2005 | Srinivasan et al. |
| 2005/0238238 A1 | 10/2005 | Xu et al. |
| 2006/0167694 A1 | 7/2006 | Mitsuyoshi |
| 2007/0250777 A1 | 10/2007 | Chen et al. |
| 2007/0276667 A1 | 11/2007 | Atkin et al. |
| 2008/0032622 A1 | 2/2008 | Kopra et al. |
| 2008/0162561 A1 | 7/2008 | Naphade et al. |
| 2008/0195654 A1 | 8/2008 | Weare |
| 2009/0277322 A1 | 11/2009 | Cai et al. |
| 2009/0306797 A1 | 12/2009 | Cox et al. |
| 2009/0313019 A1 | 12/2009 | Kato et al. |
| 2010/0161315 A1 | 6/2010 | Melamed et al. |
| 2010/0212478 A1 | 8/2010 | Taub et al. |
| 2011/0075851 A1 | 3/2011 | LeBoeuf et al. |
| 2011/0161076 A1 | 6/2011 | Davis et al. |
| 2012/0203363 A1 | 8/2012 | McKenna et al. |
| 2014/0019138 A1 | 1/2014 | Stephens, Jr. |
| 2014/0056432 A1 | 2/2014 | Loui et al. |
| 2014/0056433 A1 | 2/2014 | Emerson, III |
| 2014/0180673 A1 | 6/2014 | Neuhauser et al. |
| 2014/0180674 A1 | 6/2014 | Neuhauser et al. |
| 2014/0180675 A1 | 6/2014 | Neuhauser et al. |
| 2014/0195221 A1 | 7/2014 | Frank et al. |
| 2014/0376729 A1 | 12/2014 | Crockett |
| 2015/0332669 A1 | 11/2015 | Kalampoukas et al. |
| 2016/0012807 A1 | 1/2016 | Neuhauser et al. |
| 2016/0027418 A1 | 1/2016 | Neuhauser et al. |
| 2016/0035332 A1 | 2/2016 | Neuhauser et al. |
| 2017/0358283 A1 | 12/2017 | Neuhauser et al. |

FOREIGN PATENT DOCUMENTS

| | | |
|---|---|---|
| WO | 0211123 | 2/2002 |
| WO | 03091990 | 11/2003 |
| WO | 2012168740 | 12/2012 |

OTHER PUBLICATIONS

Cano et al., "A Review of Algorithms for Audio Fingerprinting," 2002, IEEE, 5 pages.

Haitsma et al., "A Highly Robust Audio Fingerprinting System," 2002, Philips Research, 9 pages.

Harte et al., "Detecting Harmonic Change in Musical Audio," AMCMM '06 Proceedings of the 1st ACM workshop on Audio and music computing multimedia, 2006, pp. 21-26, New York, NY, USA, 5 pages.

Klapuri, A., "Sound Onset Detection by Applying Psychoacoustic Knowledge," Acoustics, Speech, and Signal Processing, Proceedings, IEEE International Conference, 1999, pp. 3089-3092, vol. 6. IEEE, Phoenix, AZ, 4 pages.

Patent Cooperation Treaty, "International Search Report," issued by the International Searching Authority in connection with PCT application No. PCT/US2013/076934, dated Apr. 22, 2014, 6 pages.

Qing et al., "A Probabilistic Music Recommender Considering User Opinions and Audio Features," Information Processing and Management, 2007, pp. 473-487, vol. 43, 15 pages.

Tsekeridou et al., "Content-Based Video Parsing and Indexing Based on Audio-Visual Interaction," IEEE Transactions on Circuits and Systems for Video Technology, Apr. 2001, vol. 11, No. 4, 14 pages.

The United States Patent and Trademark Office, "Office Action," issued in connection with U.S. Appl. No. 13/724,836 dated Oct. 29, 2014, 6 pages.

Wang, Avery Li-Chun, "An Industrial-Strength Audio Search Algorithm," Proceedings of the International Conference on Music Information Retrieval (ISMIR), 2003, pp. 7-13, Baltimore, USA, 7 pages.

Wold et al., "Content-Based Classification, Search, and Retrieval of Audio," Muscle Fish, 1996, IEEE, 10 pages.

The United States Patent and Trademark Office, "Non-Final Office Action," issued in connection with U.S. Appl. No. 13/725,004 dated Nov. 19, 2014, 13 pages.

(56) References Cited

OTHER PUBLICATIONS

The United States Patent and Trademark Office, "Notice of Allowance," issued in connection with U.S. Appl. No. 13/725,004 dated May 29, 2015, 20 pages.
The United States Patent and Trademark Office, "Notice of Allowance," issued in connection with U.S. Appl. No. 13/725,021, dated Jun. 5, 2015, 8 pages.
The United States Patent and Trademark Office, "Notice of Allowance," issued in connection with U.S. Appl. No. 13/724,836, dated Mar. 30, 2015 (13 pages).
The United States Patent and Trademark Office, "Supplemental Notice of Allowability," issued in connection with U.S. Appl. No. 13/724,836, dated May 14, 2015 (2 pages).
The United States Patent and Trademark Office, "Notice of Allowance," issued in connection with U.S. Appl. No. 13/724,836, dated Jul. 21, 2015 (14 pages).
Patent Cooperation Treaty, "International Preliminary Report on Patentability," issued by the International Searching Authority in connection with PCT application No. PCT/US2013/076934, dated Jun. 23, 2015 (9 pages).
The United States Patent and Trademark Office, "Corrected Notice of Allowability," issued in connection with U.S. Appl. No. 13/724,836, dated Sep. 14, 2015, 6 pages.
The United States Patent and Trademark Office, "Notice of Allowability," issued in connection with U.S. Appl. No. 13/725,021, dated Sep. 15, 2015, 10 pages.
The United States Patent and Trademark Office, "Notice of Allowance," issued in connection with U.S. Appl. No. 13/725,004, dated Sep. 17, 2015, 12 pages.
The United States Patent and Trademark Office, "Supplemental Notice of Allowability," issued in connection with U.S. Appl. No. 13/724,836, dated Sep. 30, 2015, 6 pages.
The United States Patent and Trademark Office, "Supplemental Notice of Allowability," issued in connection with U.S. Appl. No. 13/725,004, dated Oct. 15, 2015, 6 pages.
IP Australia, "Patent Examination Report No. 1," issued in connection with Application No. 2013361099, dated Feb. 26, 2016, 2 pages.
IP Australia, "Notice of Acceptance," issued in connection with Application No. 2013361099, dated Apr. 21, 2016, 2 pages.
Canadian Intellectual Property Office, "Examination Report," issued in connection with Canadian Patent Application No. 2,896,096, dated May 9, 2016, 5 pages.
The United States Patent and Trademark Office, "Notice of Allowance," issued in connection with U.S. Appl. No. 14/862,508, dated Dec. 28, 2016, 11 pages.
The United States Patent and Trademark Office, "Notice of Allowance," issued in connection with U.S. Appl. No. 14/877,296, dated May 2, 2017, 17 pages.
Canadian Intellectual Property Office, "Office Action," issued in connection with Canadian Patent Application No. 2,896,096, dated Apr. 20, 2017, 3 pages.
The United States Patent and Tradmark Office, "Notice of Allowance," issued in connection with U.S. Appl. No. 14/885,216, dated Jul. 7, 2017, 19 pages.
United States Patent and Trademark Office, "Non-final Office Action," mailed in connection with U.S. Appl. No. 15/689,225, dated Oct. 9, 2018, 8 pages.
United States Patent and Trademark Office, "Notice of Allowability," mailed in connection with U.S. Appl. No. 14/862,508, dated Mar. 2, 2017, 6 pages.
United States Patent and Trademark Office, "Notice of Allowability," mailed in connection with U.S. Appl. No. 14/862,508, dated Jan. 27, 2017, 4 pages.
United States Patent and Trademark Office, "Non-Final Office Action," mailed in connection with U.S. Appl. No. 14/862,508, dated Aug. 26, 2016, 13 pages.
United States Patent and Trademark Office, "Notice of Allowability," mailed in connection with U.S. Appl. No. 14/862,508, dated Mar. 23, 2017, 10 pages.
United States Patent and Trademark Office, "Notice of Allowance," mailed in connection with U.S. Patent Application No. 15/689,225, on Mar. 8, 2019, 7 pp.

\* cited by examiner

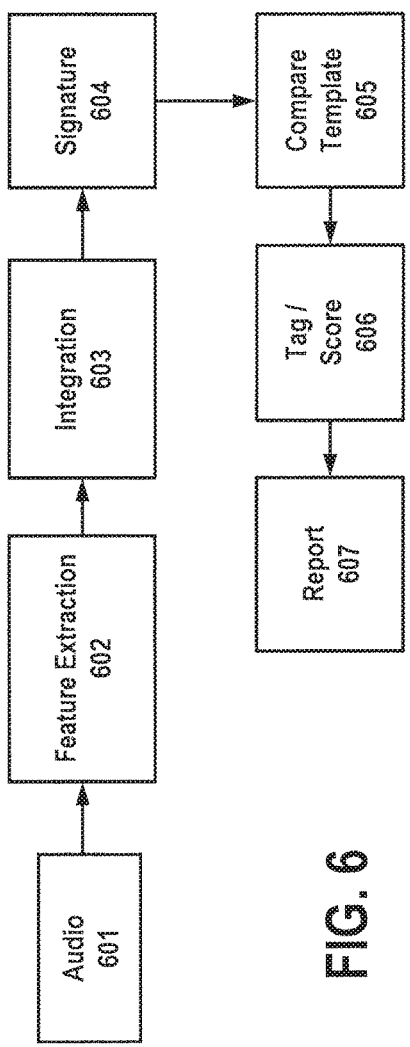
FIG. 6
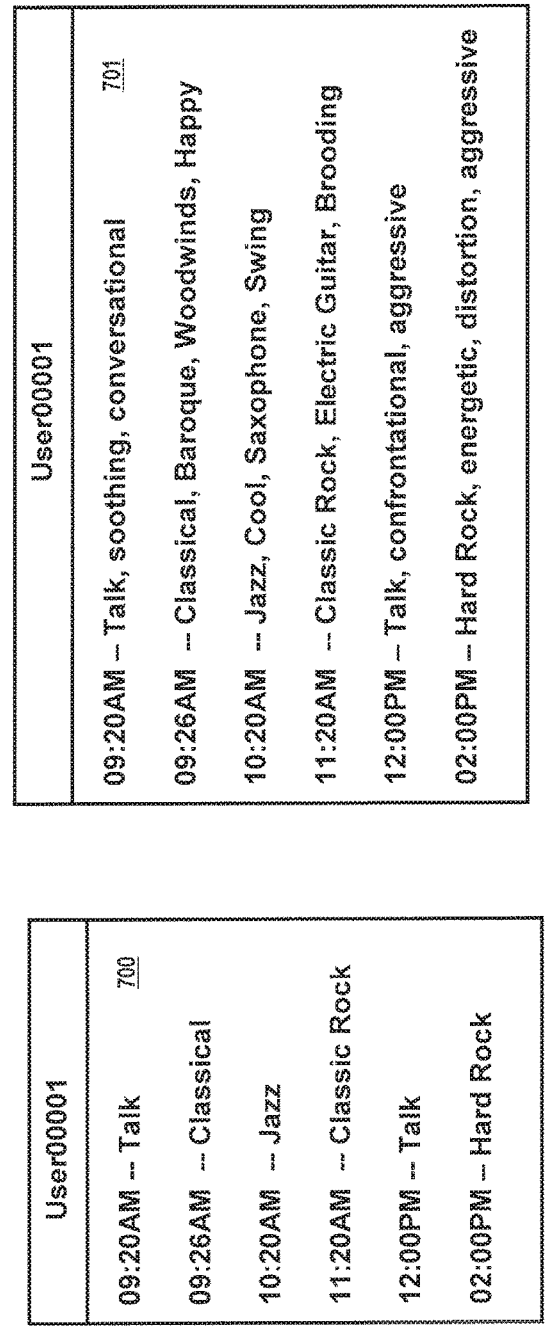
FIG. 7B
FIG. 7A

AUDIO PROCESSING TECHNIQUES FOR SEMANTIC AUDIO RECOGNITION AND REPORT GENERATION

RELATED APPLICATIONS

This patent arises from a continuation of U.S. patent application Ser. No. 14/885,216, (now U.S. Pat. No. 9,812,109), which is titled "Audio Processing Techniques for Semantic Audio Recognition and Report Generation," and which was filed on Oct. 16, 2015, which is a continuation of U.S. patent application Ser. No. 13/724,836 (now U.S. Pat. No. 9,195,649), which is titled "Audio Processing Techniques for Semantic Audio Recognition and Report Generation," and which was filed on Dec. 21, 2012. U.S. patent application Ser. No. 14/885,216 and U.S. patent application Ser. No. 13/724,836 are hereby incorporated by reference herein in their entireties. Priority to U.S. patent application Ser. No. 14/885,216 and U.S. patent application Ser. No. 13/724,836 is claimed.

TECHNICAL FIELD

The present disclosure relates to systems, apparatuses and processes for processing and communicating data, and, more specifically, to process audio portions of media data to extract semantic audio features, and to convert those features for audience measurement research.

BACKGROUND INFORMATION

The use of audio "fingerprints" or "signatures" has been known in the art, and was partly pioneered by such companies as Arbitron for audience measurement research. Audio signatures are typically formed by sampling and converting audio from a time domain to a frequency domain, and then using predetermined features from the frequency domain to form the signature. The frequency-domain audio may then be used to extract a signature therefrom, i.e., data expressing information inherent to an audio signal, for use in identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties. The signature extraction may serve to identify and determine media exposure for the user of a device.

While audio signatures have proven to be effective at determining exposures to specific media, they can be computationally taxing, and further require databases of thousands, if not millions of audio signatures related to specific songs. Additionally, conventional audio signature systems provide little to no semantic information regarding the media. As used herein below, the term "semantic information" refers to information processed from time, frequency and/or amplitude components of media audio, where these components may serve to provide generalized information regarding characteristics of the media (e.g., genre, instruments used, style, etc.), as well as emotionally-related information that may be defined by a customizable vocabulary relating to audio component features (e.g., happy, melancholy, aggressive).

Some efforts have been made to classify, characterize, and match music genres and are described in U.S. Pat. No. 7,003,515, titled "Consumer Item Matching Method and System," issued Feb. 21, 2006 and is incorporated by reference herein. However, these efforts rely on massive databases of songs, and often rely on humans to physically characterize music. Importantly, such techniques do not fully take advantage of audio signature information when analyzing audio content. Other efforts have been made to automatically label audio content for Music Information Retrieval Systems (MIR), such as those described in U.S. patent application Ser. No. 12/892,843, titled "Automatic labeling and Control of Audio Algorithms by Audio Recognition," filed Sep. 28, 2010, which is incorporated by reference in its entirety herein. However such systems can be unduly complex and require direct mapping of features among individual songs, which can have massive memory requirements. As such, there is a need in the art to provide semantic information based on generic templates that may be used to identify semantic characteristics of audio. Additionally, there is a need to identify such characteristics for the purposes of audience measurement. Currently advertisers target listeners by using radio ratings. These rating are gathered by using encoding or audio matching systems. As listening/radio goes to a one-to-one experience (e.g. Pandora, Spotifiy, Songza, etc.), there is a need for advertisers to be able to target listeners by the style of music they listen, along with other related information. Semantic analysis can identify this information and provide useful tools for targeted advertisement.

SUMMARY

Accordingly, under one embodiment, a method is disclosed for forming an audio template for determining semantic audio information, where the method includes the steps of receiving a plurality of audio signals in a computer processing device; extracting a first audio feature from each of the received audio signals, said first audio feature comprising at least one of a temporal, spectral, harmonic and rhythmic feature; extracting a second audio feature from each of the received audio signals, said second feature comprising at least one of a temporal, spectral, harmonic and rhythmic feature, wherein said second audio feature is different from the first audio feature; determining a first range for the first audio features and a second range for the second audio feature; and associating and storing the first and second ranges for comparison against other audio features from subsequent audio signals to generate tags signifying semantic audio information for the subsequent audio signals.

In another embodiment, a processor-based method is disclosed for determining semantic audio information from an audio signal, the method including the steps of receiving the audio signal in a computer processing device; extracting a first audio feature from the received audio signal, said first audio feature comprising at least one of a temporal, spectral, harmonic and rhythmic feature; extracting a second audio feature from the received audio signal, said second feature comprising at least one of a temporal, spectral, harmonic and rhythmic feature, wherein said second audio feature is different from the first audio feature; processing the first and second audio features to compare the first and second audio features to a plurality of stored audio feature ranges having tags associated therewith; and determining the stored audio feature ranges having the most similar comparison to the first and second audio features, wherein the tags associated with the audio feature ranges having the closest comparison are used to determine semantic audio information for the audio signal.

In yet another embodiment, an apparatus and system is disclosed for forming an audio template for determining semantic audio information, where the apparatus and/or system includes an input for receiving a plurality of audio signals in a computer processing device; a processor, operatively coupled to the input, said processor being configured to extract a first audio feature from each of the received audio signals, said first audio feature comprising at least one of a temporal, spectral, harmonic and rhythmic feature, said processor being further configured to extract a second audio feature from each of the received audio signals, said second feature comprising at least one of a temporal, spectral, harmonic and rhythmic feature, and wherein said second audio feature is different from the first audio feature; and a storage, operatively coupled to the processor, wherein the processor is configured to determine a first range for the first audio features and a second range for the second audio feature and associate, and associate and store in the storage the first and second ranges for comparison against other audio features from subsequent audio signals for generating semantic audio information for the subsequent audio signals.

Additional features and advantages of the various aspects of the present disclosure will become apparent from the following description of the preferred embodiments, which description should be taken in conjunction with the accompanying drawings.

BRIEF DESCRIPTION OF THE DRAWINGS

FIG. 6 illustrates an exemplary tag score utilizing the audio processing described above in FIG. 5; and FIGS. 7A and 7B illustrate exemplary reports that may be generated from tag scoring under another exemplary embodiment.

DETAILED DESCRIPTION

Figure 1:
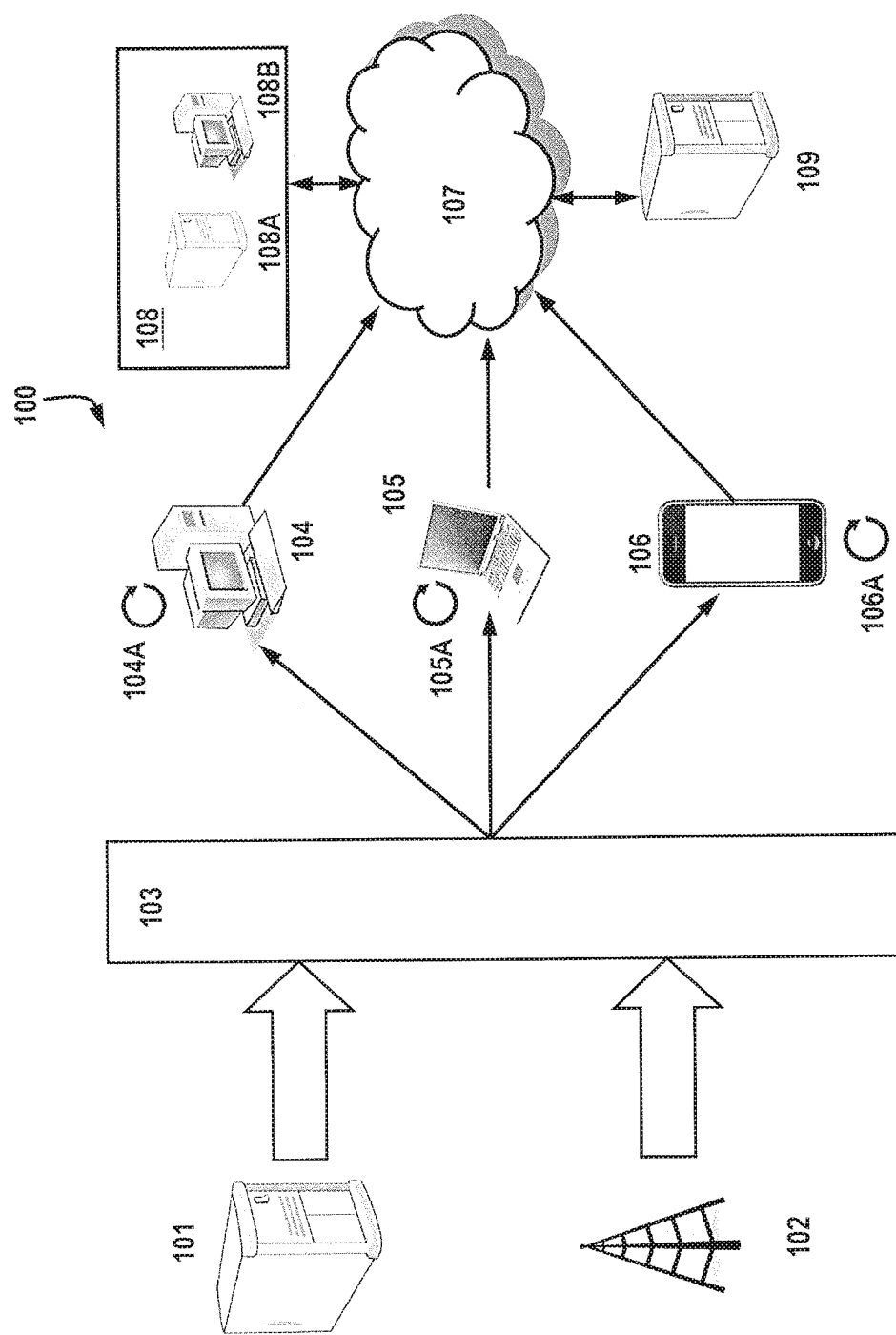
FIG. 1 is a block diagram illustrating a media measurement system under one exemplary embodiment.

FIG. 1 is an exemplary block diagram for a system 100, wherein media is provided from a broadcast source 102 (e.g., television, radio, etc.) and/or a data source 101 (e.g., server, cloud, etc.). The media is communicated to a media distribution network 103, which has the ability to pass through the broadcast and/or data to remote users or subscribers. Such media distribution networks 103 are well known and may include broadcast stations, satellite/cable, routers, servers, and the like.

The media may be received at one or more locations using any of a number of devices, including a personal computer 104, laptop 105, and smart phone or tablet 106. It is understood by those skilled in the art that the present disclosure is not limited strictly to devices 104-106, but may include any device configured to receive and/or record media including set-top-boxes, IPTV boxes, personal people meters, and the like. Additionally, devices, such as 104-106 may be equipped with one or more microphones (not shown) for transducing ambient audio for sampling and processing. Examples of such configurations may be found in U.S. patent application Ser. No. 13/341,272, titled "Apparatus, System And Method For Activating Functions In Processing Devices Using Encoded Audio And Audio Signatures," filed Dec. 30, 2011, and U.S. patent Ser. No. 13/341,365, titled "Activating Functions In Processing Devices Using Start Codes Embedded In Audio" filed Dec. 30, 2011, both of which are incorporated by reference in their entireties herein. Devices 104-106 may also be capable of reproducing media (104A-106A) on the device itself, where the media is transferred, downloaded, stored and/or streamed.

As each device 104-106 receives media from network 103 and/or reproduces media locally 104A-106A, the audio portion of the media is sampled and processed to form semantic audio signatures or templates, where resulting signature data is time stamped and transmitted to computer network 107 via wired or wireless means that are known in the art. In addition to semantic audio signature data, devices 104-106 may additionally transmit identification information that identifies the device and/or the user registered for the device. Under one embodiment, demographic information relating to the users of any of devices 104-106 may be transmitted as well. The semantic signatures are then stored in one or more remote locations or servers 109, where they are compared with audio signature templates provided from system 108 for semantic audio analysis. Under one exemplary embodiment, system 108 comprises at least one workstation 108B and server 108A, where audio signature templates are produced using any of the techniques described below, and forwarded to server(s) 109.

Figure 2:
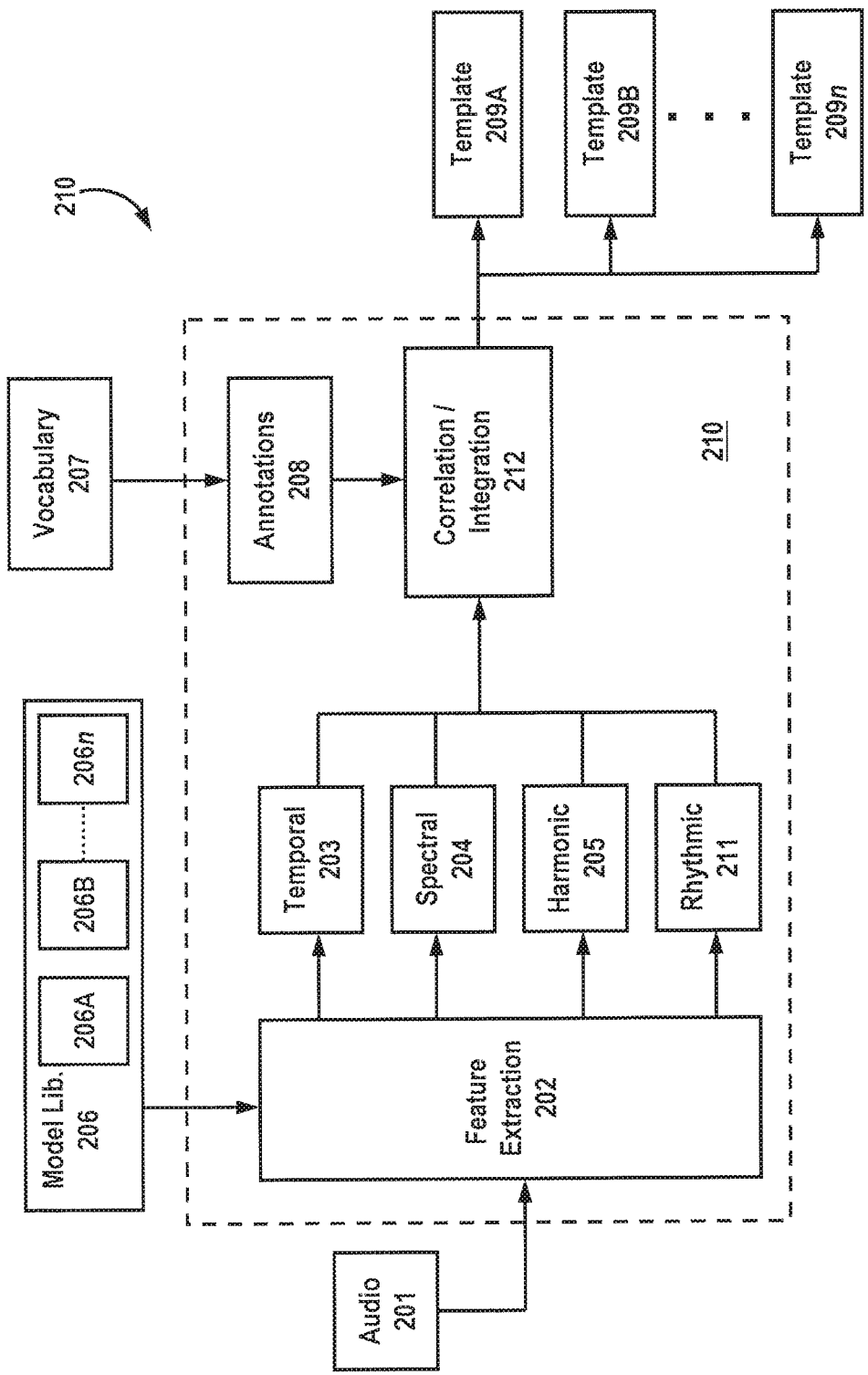
FIG. 2 illustrates one process for generating audio templates for use in extracting semantic features from audio under an exemplary embodiment.

Turning to FIG. 2, an exemplary configuration is shown for creating audio signature templates, where audio is fed into a computer workstation (e.g., 108B). Under one exemplary embodiment, audio 201 is sampled, processed and subjected to one or more feature extractions in 202, preferably performed in a processor or processing apparatus 210 associated with a workstation (108B) or the like. While specific feature sets may vary, under a preferred embodiment, extracted feature sets in 204 may include energy-based features, spectral features, rhythmic features, temporal features and/or harmonic features. Depending on the feature set used, different models (206A-206n) may be called from a model library 206 memory in order to facilitate appropriate feature extraction. The feature extraction process is preferably controlled by software operative on a tangible medium, such as Psysound (http://psysound.wikidot.com/), CLAM (http://clam-project.org/), Marsyas (http://marsyas.sness.net/), MIRToolbox (https://www.jyu.fi/hum/laitokset/musiikki/en/research/coe/materials/mirtoolbox), MA Toolbox (http://www.ofai.at/~elias.pampalk/ma/), Sound Description Toolbox, and/or any other suitable program, preferably compatible with the MATLAB and MPEG-7 format.

Additionally, feature extraction in 202 may advantageously be separated into multiple stages, where, for example, a first stage is responsible for processing temporal features 203, while a second stage is independently responsible for processing spectral features 204. Alternately or in addition, the stages may be separated by sample size, so that longer samples are processed for certain features before shorter sub-samples are processed for other features. This configuration may be advantageous for extracting features that are optimally detected over longer periods of time (e.g., 30 sec.), while reserving shorter segments (e.g., 5-6 sec., 100-200 ms) for other feature extraction processes.

Feature extraction 202 preferably includes pre-processing steps such as filtering and normalization to provide zero mean and unity variance. A first-order finite impulse response (FIR) filter may also be used to increase the relative energy of high-frequency spectrum. Frame blocking or "windowing" is then performed to segment the signal into statistically stationary blocks. The frame size (in terms of sample points) should be equal to the powers of 2 (such as 256, 512, 1024, etc) in order to make it suitable for transformation (e.g., FFT). Hamming window may be used to weight the pre-processed frames. In order to reduce the difference between neighboring frames, an overlap may be applied that is up to ⅔ of the original frame size. However, the greater the overlap, the more computational power is needed.

For temporal feature extraction 203, features are taken from the native domain of the audio signal, and without any preceding transformation. Temporal features include, but are not limited to, amplitude, power, and zero-crossing of the audio signal. Amplitude based features are processed directly from the amplitudes of a signal and represent the temporal envelope of an audio signal. Utilizing an audio waveform descriptor (e.g., MPEG-7), a compact description of the shape of a waveform may be formed by computing the minimum and maximum samples within non-overlapping portions of frames, resulting in a representation of the (preferably down-sampled) waveform envelope over time. Also, amplitude descriptors may be used by separating the audio signal into segments having low and high amplitudes according to an adaptive threshold. The duration, variation of duration and energy of segments crossing the thresholds would be recorded to form a specific descriptor for an audio segment. The amplitude descriptor could thus be used to characterize audio in terms of quiet and loud segments and to distinguish audio with characteristic waveform envelopes.

Generally speaking, the energy of a signal is the square of the amplitude of a waveform, and power may be represented are the transmitted energy of the signal per unit of time. Short Time Energy (STE) processing may be performed on the envelope of a signal to determine mean energy per frame. Thus, power may be represented as the mean square of a signal. Root-Mean-Square (RMS) may used to measure the power (or loudness, volume) of a signal over a frame. The global energy of a signal x can be computed by taking the root average of the square of the amplitude (RMS), expressed by $$x_{RMS} = \sqrt{\frac{1}{n}\sum_{i=1}^{n} x_i^2}$$

Additionally, a temporal centroid (MPEG-7) may be used to determine a time average over the envelope of a signal to determine a point(s) in time where most of the energy of the signal is located on average. Such features are advantageous for distinguishing percussive from sustained sounds.

Continuing with the temporal features, the zero crossing rate (ZCR) may be used to measure signal noisiness and may be calculated by taking the mean and standard deviation of the number of signal values that cross the zero axis in each time window (i.e., sign changes of the waveform:

$$ZCR = \frac{1}{T}\sum_{t=m-T+1}^{m} \frac{|sgn(s_t) - sgn(s_{t-1})|}{2} w(m-t)$$

where T is the length of a time window, $s_t$ is the magnitude of the t-th time-domain sample and w is a rectangular window. The ZCR is advantageous in discriminating between noise, speech and music, where the ZCR would be greatest for noise, less for music, and lesser still for speech. Additional techniques, such as linear prediction zero crossing ratios could be used to determine a ratio of the zero crossing count of a waveform and the zero crossing count of the output of a linear prediction analysis filter. Such a feature would be advantageous in determining the degree of correlation in a signal.

While time domain features may provide useful data sets for semantic audio analysis, even more valuable information may be obtained from the spectral domain. To achieve this, a transformation should be performed on an audio signal to convert time domain features to the spectral domain wherein the existence and progression of periodic elements may be obtained, as well as pitch, frequency ranges, harmonics, etc. The most common and well-known transformation is the Fourier Transformation. For discrete digital signals, a Discrete Fourier Transformation (DFT) is generally known as $$X_k = \sum_{n=-0}^{N-1} x_n e^{-\frac{2\pi i}{N}nk} \quad k = 0, 1, \ldots, N-1$$

where $x_n$ are the time-based complex numbers, N is the number of values to transform and XA the resulting Fourier transformed complex numbers (or "Fourier coefficients").

The spectral domain (204) allows several extractions and computational time-invariant possibilities that bring out characteristic features and representations like spectrograms, energy deviations, frequency histograms and magnitudes of certain frequency range transformation that illustrate its influence on human perception of audio. In addition, time discrete Short Time Fourier Transformations (STFT) are preferably performed on short single segments of audio that is changing over time, resulting in a representation of frequency lots at a specific time, which may further be depicted in a time-frequency plot that may further be semantically processed using Bark scales. The Bark scale is a psycho acoustic scale that matches frequency range intervals to a specific number, and is based on the perception of pitch for human beings with respect to the amount of acoustic "feeling." It considers the almost-linear relation in lower frequency ranges as well as the logarithmic in higher ranges and its basic idea originates from frequency grouping and the "subdivision concept" referred to in the area of human hearing. As STFT may produce real and complex values, the real values may be used to process the distribution of the frequency components (i.e., spectral envelope) while the complex values may be used to process data relating to the phase of those components.

Under one embodiment, spectral features 204 are extracted under STFT, and, depending on the model used, may produce timbral texture features including spectral centroid, spectral rolloff, spectral flux, spectral flatness measures (SFM) and spectral crest factors (SCF). Such features are preferably extracted for each frame and then by taking the mean and standard deviation for each second. The sequence of feature vectors may be combined and/or collapsed into one or more vectors representing the entire signal by taking again the mean and standard deviation. A spectral centroid (SC) refers to the centroid, or "center of gravity" of the magnitude spectrum of the STFT and may be expressed as $$SC = \frac{\sum_{n=1}^{N} n A_t^n}{\sum_{n=1}^{N} A_t^n}$$

where $A_t^n$ is the magnitude of the spectrum at the t-th frame And the n-th frequency bin, and N is the total number of bins. As the centroid provides a measure of spectral shape, a higher spectral centroid will indicate a "brighter" audio texture.

The spectral rolloff is a spectral feature that estimates the amount of high frequency in a signal. More specifically, spectral rolloff may be defined as the frequency k, below which a certain fraction or percentage of total energy is contained. This fraction may be fixed by default to a specific number, such as 0.85 or 0.95, such as:

$$\sum_{n=1}^{k_t} A_t^n = 0.85 * \sum_{n=1}^{k_t} A_t^n$$

Spectral Flux (SF) estimates the amount of local spectral change and may be defined as a spectral feature representing the square of the difference between the normalized magnitudes of successive frames:

$$SF = \sum_{n=1}^{N} (a_t^n - a_{t-1}^n)^2$$

where a denotes the normalized magnitude of the spectrum that is preferably normalized for each frame. Because spectral flux represents the spectral variations between adjacent frames, it may be correlated to features such as articulation.

Tonalness is an audio feature that is useful in quantifying emotional perceptions, where joyful or peaceful melodies may be characterized as being more tonal (tone-like), while angry or aggressive melodies are characterized as being more atonal (noise-like). Features indicating tonalness include spectral flatness (SFL) and spectral crest factors (SCF), where SFL is expressed as the ratio between the geometric mean of the power spectrum and its arithmetic mean:

$$SFL = \frac{\left(\prod_{n \in B^k} A_t^n\right)^{1/N_k}}{\frac{1}{N_k} \sum_{n \in B^k}^{N} A_t^n}$$

and SCF is the ratio between the peak amplitude and the RMS amplitude:

$$SCF = \frac{\max_{n \in B^k} A_t^n}{\frac{1}{N_k} \sum_{n=1}^{N} A_t^n}$$

where $B^k$ denotes the kt-th frequency subband and $N_k$ is the number of bins in $B^k$. While any suitable number of subbands may be used, under one exemplary embodiment, 24 subbands are used for SFL and SCF extraction.

In addition to the above spectral features, it may be advantageous to also extract Mel-frequency cepstral coefficients (MFCCs) which denote coefficients of a discrete cosine transform (DCT) of each short-term log power spectrum expressed on a non-linear perceptually-related Mel-frequency scale to represent the formant peaks of the spectrum. Preferably, the mean and standard deviation of the first 13-20 MFCCs of each frame are taken. Since MFCCs average the spectral distribution in each subband, some of the relative spectral information may be lost. To compensate for this, and octave based spectral contrast (OBSC) may be used to capture the relative energy distribution of the harmonic components in the spectrum. OBSC considers the strength of spectral peaks and valleys in each subband separately. In general, spectral peaks correspond to harmonic components and spectral valleys correspond to non-harmonic components or noise in a music piece. Therefore, the contrast between spectral peaks and spectral valleys will reflect the spectral distribution.

Under another embodiment, spectral features may include the extraction of Daubechies wavelets coefficient histograms (DWCH), which is computed from the histograms of Daubechies wavelet coefficients at different frequency subbands with different resolutions, and is described in U.S. patent application Ser. No. 10/777,222, titled "Music Feature Extraction Using Wavelet Coefficient Histograms", filed Feb. 13, 2004, and is incorporated by reference in its entirety herein.

As different spectral features are extracted, they may be used or combined to form sensory features such as spectral dissonance, irregularity and inharmonicity. Spectral dissonance measures the noisiness of the spectrum, where notes that do not fall within a prevailing harmony are considered dissonant. Spectral dissonance may be estimated by computing the peaks of the spectrum and taking the average of all the dissonance between all possible pairs of peaks.

Irregularity measures the degree of variation of the successive peaks of the spectrum and may be computed by summing the square of the difference in amplitude between adjoining partials, or $$\frac{\sum_{n=1}^{N} (A_t^n - A_t^{n+1})^2}{\sum_{n=1}^{N} A_t^n * A_t^n}$$

Alternately, irregularity may be measured using Krimphoff's method, which defines irregularity as the sum of amplitude minus the mean of the preceding, current, and next, amplitude:

$$\sum_{n=2}^{N-1} \left| A_t^n - \frac{A_t^{n-1} + A_t^n + A_t^{n+1}}{3} \right|$$

Inharmonicity estimates the amount of partials that depart from multiples of the fundamental frequency. It is computed as an energy weighted divergence of the spectral components from the multiple of the fundamental frequency, or $$\frac{2}{f_0} \frac{\sum_{n=1}^{N} |f_n - nf_0|(A_t^n)^2}{\sum_{n=1}^{N} (A_t^n)^2}$$

where $f_n$ is the n-th harmonic of the fundamental frequency $f_0$. The inharmonicity represents the divergence of the signal spectral components from a purely harmonic signal. The resulting value ranges from 0 (purely harmonic) to 1 (inharmonic)

Still referring to FIG. 2, harmonic feature extraction 205 may also be performed to extract features from the sinusoidal harmonic modeling of an audio signal. Harmonic modeling may be particularly advantageous for semantic analysis as natural/musical sounds are themselves harmonic, consisting of a series of frequencies at multiple ratios of the lowest frequency, or fundamental frequency $f_0$. Under one embodiment, a plurality of pitch features (e.g., salient pitch, chromagram center) and tonality features (e.g., key clarity, mode, harmonic change) are extracted. The perceived fundamental frequency of a time frame (e.g., 50 ms, 50% overlap) may be calculated using a multi-pitch detection algorithm by decomposing an audio waveform into a plurality of frequency bands (e.g., one below and one above 1 kHz), computing an autocorrelation function of the envelope in each subband, and producing pitch estimates by selecting the peaks from the sum of the plurality of autocorrelation functions. The calculation corresponding to the highest peak is deemed the "salient pitch."

Alternately or in addition, a pitch class profile or wrapped chromagram may be computed for each frame (e.g., 100 ms, ⅛ overlap), where the centroid of the chromagram is selected as the fundamental frequency, or chromagram centroid. A wrapped chromagram may project a frequency spectrum onto 12 bins representing 12 semitones (or chroma) of a musical octave (e.g., 440 Hz (C4) and 880 Hz (C5) would be mapped to chroma "C"). By comparing a chromagram to the 24 major and minor key profiles, key detection may be performed to estimate the strength of a frame compared to each key (e.g., C major). The key associated with the greatest strength would be identified as the key strength or key clarity. The difference between the best major key and best minor key in strength may be used as an estimate of music mode, which may be used to characterize a fixed arrangement of the diatonic tones of an octave. The numerical value would be indicative of audio content being more major, and thus having a higher value.

Harmonic changes (e.g., chord changes) may also be determined using a Harmonic Change Detection Function (HCDF) algorithm modeled for equal tempered pitch space for projecting collections of pitches as tonal centroid points in a 6-D space. The HCDF system comprises a constant-Q spectral analysis at the lowest level, followed by a 12-semitone chromagram decomposition. A harmonic centroid transform is then applied to the chroma vectors which is then smoothed with a Gaussian filter before a distance measure is calculated. High harmonic change would indicate large differences in harmonic content between consecutive frames. Short term features could be aggregated by taking mean and standard deviation. Additional information on HCDF techniques may be found in Harte et al., "Detecting Harmonic Changes in Musical Audio," AMCMM '06 Proceedings of the 1st ACM workshop on Audio and music computing multimedia, pp. 21-26 (2006).

Alternately or in addition, a pitch histogram may be calculated using Marsyas toolbox, where pluralities of features may be extracted from it, including tonic, main pitch class, octave range of dominant pitch, main tonal interval relation, and overall pitch strength. Modules such as Psysound may be used to compare multiple pitch-related features including the mean, standard deviation, skewness and kurtosis of the pitch and pitch strength time series.

Additionally, rhythmic features 211 may be extracted from the audio signal. One beat detector structures may comprise a filter bank decomposition, followed by an envelope extraction step, followed by a periodicity detection algorithm to detect the lag at which the signal's envelope is most similar to itself. The process of automatic beat detection may be thought of as resembling pitch detection with larger periods (approximately 0.5 s to 1.5 s for beat compared to 2 ms to 50 ms for pitch). The calculation of rhythmic features may be based on the wavelet transform (WT), where WT provides high time resolution and low-frequency resolution for high frequencies, and low time and high-frequency resolution for low frequencies. The discrete wavelet transform (DWT) is a special case of the WT that provides a compact representation of the signal in time and frequency that can be computed efficiently using a fast, pyramidal algorithm related to multi-rate filterbanks.

The feature set for representing rhythm structure may be based on detecting the most salient periodicities of the signal. The signal may be first decomposed into a number of octave frequency bands using the DWT. Following this decomposition, the time domain amplitude envelope of each band is extracted separately. This is achieved by applying full-wave rectification, low pass filtering, and down-sampling to each octave frequency band. After mean removal, the envelopes of each band are then summed together and the autocorrelation of the resulting sum envelope is computed. The dominant peaks of the autocorrelation function correspond to the various periodicities of the signal's envelope. These peaks are accumulated over the whole sound file into a beat histogram where each bin corresponds to the peak lag, i.e., the beat period in beats-per-minute (BPM). The amplitude of each peak is preferably added to the beat histogram so that, when the signal is very similar to itself (i.e., strong beat) the histogram peaks will be higher. The beat histogram may be processed to generate additional features, such as beat strength, amplitude and period of the first and second peaks of the beat histogram, and the ratio of the strength of the two peaks in terms of BPMs.

Rhythm patterns may also be extracted by calculating a time-invariant representation for the audio signal to provide data on how strong and fast beats are played within the respective frequency bands. The amplitude modulation of the loudness sensation per critical-band for each audio frame sequence (e.g., 6 sec) is calculated using a FFT. Amplitude modulation coefficients may be weighted based on the psychoacoustic model of the fluctuation strength. The amplitude modulation of the loudness has different effects on human hearing sensations depending on the modulation frequency. The sensation of fluctuation strength tends to be most intense around 4 Hz and gradually decreases up to a modulation frequency of 15 Hz. For each frequency band, multiple values for modulation frequencies between specific ranges (e.g., 0 and 10 Hz) are obtained to indicate fluctuation strength. To distinguish certain rhythm patterns better and to reduce irrelevant information, gradient and Gaussian filters may be applied. To obtain a single representation for each audio signal 201 input into 210, the median of the corresponding sequences may be calculated to produce an X by Y matrix. A rhythm pattern may be further integrated into a multi-bin (e.g., 60-bin) rhythm histogram by summing amplitude modulation coefficients across critical bands. The mean of the rhythm histogram may be regarded as an estimate of the average tempo.

Rhythm strength may be calculated as the average onset strength of an onset detection curve using algorithmic processes described in Anssi Klapuri, "Sound Onset Detection by Applying Psychoacoustic Knowledge," Proceedings., 1999 IEEE International Conference on Acoustics, Speech, and Signal Processing, vol. 6, pp. 3089-3092 (1999), where the "onset" refers to the start of each musical event (e.g., note). Rhythm regularity and rhythm clarity may be computed by performing autocorrelation on the onset detection curve. If a music segment has an obvious and regular rhythm, the peaks of the corresponding autocorrelation curve will be obvious and strong as well. Onset frequency, or event density, is calculated as the number of onset notes per second, while tempo may be estimated by detecting periodicity from the onset detection curve.

Still referring to FIG. 2, each of the temporal 203, spectral 204, harmonic 205, and rhythmic 211 features are correlated to the audio 201 in 212 to arrange a base set of features. These features may be define in system 210 using vocabulary database 207 that contains a lexicography of various and different words/phrases used to tag the semantic information contained in 212. Under a preferred embodiment, vocabulary 207 is customizable by an operator of system 210, where specific words, phrases and descriptions may be entered, depending on the need and audio features involved. For example, in a very simple configuration, the vocabulary may comprise a few genres, styles, and emotive descriptors, where descriptive words/phrases (tags) are mapped to respectively extracted features. In one embodiment, descriptive tags may be mapped to multiple extracted features. Such a configuration is advantageous in instances where multiple variations of a specific feature (e.g., beat histogram) may be attributable to a single tag (e.g., genre, emotive descriptor).

In another embodiment, entries in the vocabulary are subjected to an annotation process 208 which is advantageous for creating more complex multiclass, multi-tag arrangements and classifications, where tags are arranged in a class, sub-class hierarchy. A class-conditional distribution may then be formed during a training process to attribute tags to extracted features that are positively associated with that tag. The tags may then be arranged in a rank order for later processing and identification using techniques such as Byes' rule, k-nearest neighbor, and fuzzy classification, among others. Once extracted features are tagged and integrated in 212, a plurality of templates 209A-209n are formed comprising one or more tagged extracted features, and stored for later comparison.

Figure 3A:
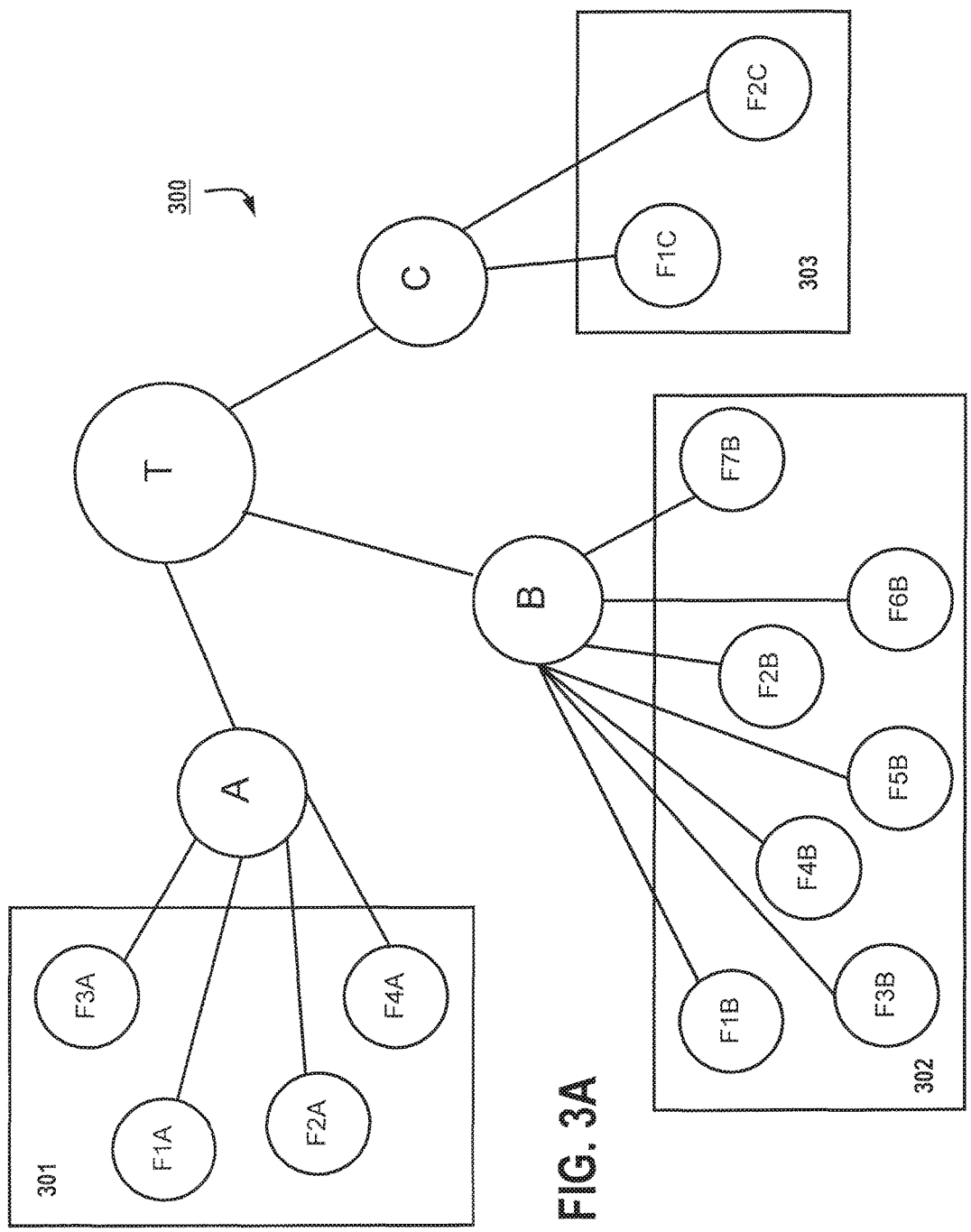
FIG. 3A illustrates audio feature template arrangement under another exemplary embodiment.

FIG. 3A provides one example of a template arrangement 300, where tag T is comprised of 3 extracted audio features tagged as A-C. In this example, tagged feature A is associated with extracted features F1A-F4A 301, tagged feature B is associated with features F1B-F7B 302, and tagged feature C is associated with extracted features F1C-F2C 303. In each of these (301-303), extracted features may be values associated with the temporal 203, spectral 204, harmonic 205 and/or rhythmic 211 processing performed in FIG. 2. Under a preferred embodiment, certain individual extracted features 301-33 may be duplicated among the tags (A-C), to simplify the datasets used for a tree hierarchy.

Figure 3B:
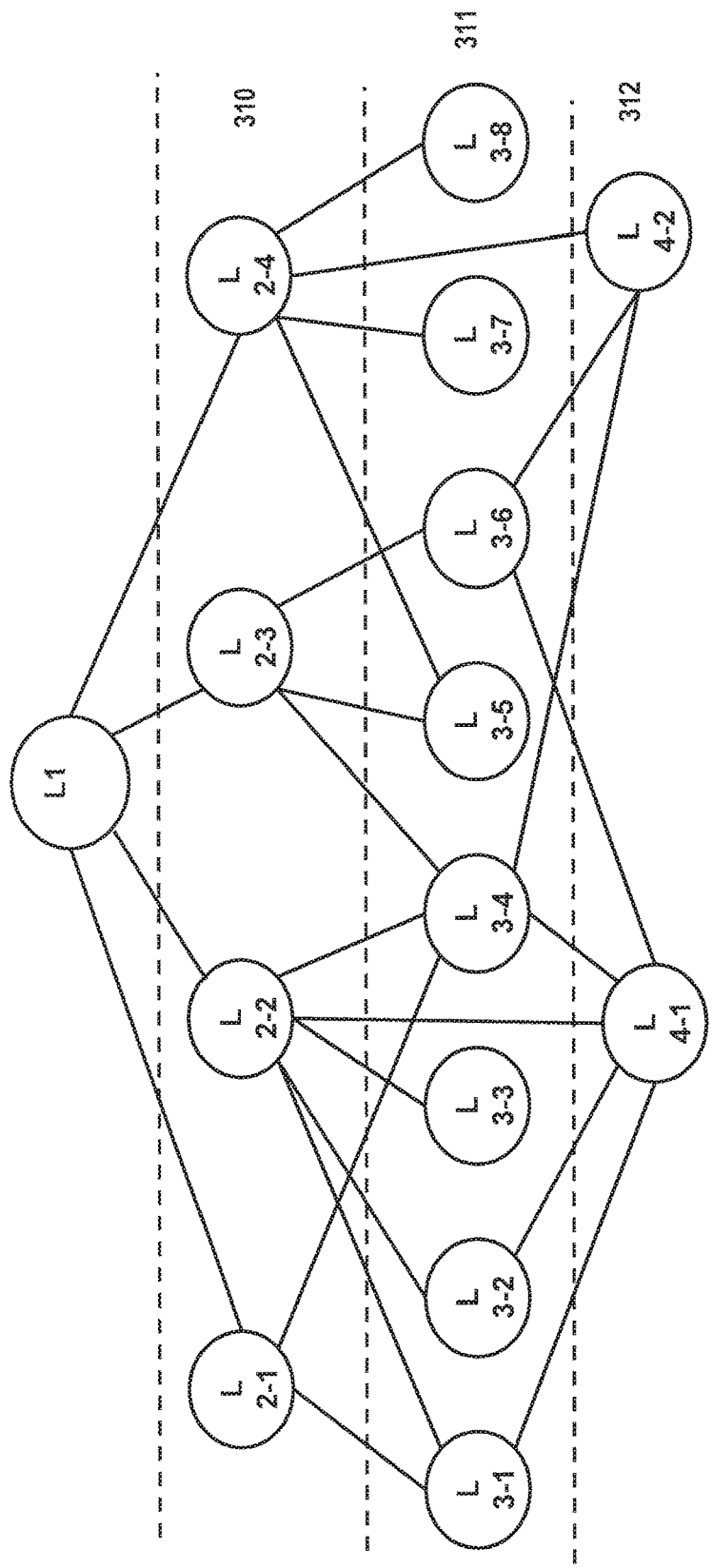
FIG. 3B illustrates an audio feature template hierarchy under another exemplary embodiment.

FIG. 3B exemplifies one possible hierarchy arrangement where a global tag L1 represents the overall characteristics of extracted features and is labeled according to an assigned vocabulary. In this example, global tag L1 is characterized by four lower-level (310-312) tags (L2-1 through L2-4). Each of these lower-level tags may represent different features as a class that may be extracted from different aspects of audio (e.g., temporal, spectral, harmonic, rhythmic), which may be correlated and cross-correlated as shown in FIG. 3B. Below level 310, is a first sub-level 311 provides additional features, followed by a second sub-level 312 having further additional features that also are correlated and/or cross-correlated. It is understood by those skilled in the art that the tags and level hierarchies may be arranged in a myriad of ways, depending on the needs of the designer. For example, under an alternate embodiment, global tags may represent any of genre, emotional descriptor, instrument, song style, etc. Mid-level features may be associated with lower-level tags representing rhythmic features, pitch and harmony. A sub-level may include tags representing low-level features such as timbre and temporal features. Tags may had additional annotations associated with their class as well, e.g., rhythm (sub: beat histogram, BPM), pitch (sub: salient pitch, chromagram center), timbre (sub: ZCR, SC, SFL, MFCC, DWCH). Moreover, the hierarchical arrangement may be configured to separately take into consideration short-term audio features (e.g., timbre) and long-term audio features (e.g., temporal, pitch, harmony).

The arrangement may be useful in taking advantage of numerous classification techniques for forming and identifying semantic audio information. Under one embodiment, each audio frame is classified separately, and classification results are combined over an analysis segment to get a global classification result. Under another embodiment, the temporal relationship between frames may be taken into account. One exemplary classifier is a k-Nearest Neighbor Classifier, where the distance between tested tagged feature vectors and the training vectors is measured, and the classification is identified according to the k nearest training vectors. A Gaussian Mixture Model may be used to obtain distributions of feature values for specific musical characteristics, and may be modeled as a weighted sum of Gaussian density functions. This mixture may be used to determine the probability of a test feature vector as belonging to a particular audio characteristic.

In one embodiment, tree-based vector quantization may be used to model discrimination function between classes defined by a set of labeled codebook vectors. A quantization tree is formed to partition the feature space into regions with maximally different tag/class populations. The tree may used to form a histogram template for an audio characteristic and the classification may be done by matching template histograms of training data to the histograms of the test data. The classification can alternately be done with a feed-forward neural network that is trained with examples from different classes so as to map the high-dimensional space of feature vectors onto the different classes. A Linear Discriminant Analysis (LDA) may be used to find a linear transformation for the feature vectors that best discriminates them (e.g., using Euclidean distance) among classes.

In an alternate embodiment, a binary classification approach may be done using Support Vector Machines (SVMs), where feature vectors are first non-linearly mapped into a new feature space and a hyperplane is then searched in the new feature space to separate the data points of the classes with a maximum margin. The SVM may be extended into multi-class classification with one-versus-the-rest, pairwise comparison, and multi-class objective functions. In yet another embodiment, a Hidden Markov Model (HMM) may be used to account for the temporal order of frames, where the HMM may consist of several GMMs and the probabilities describing the transitions between them.

Figure 4:
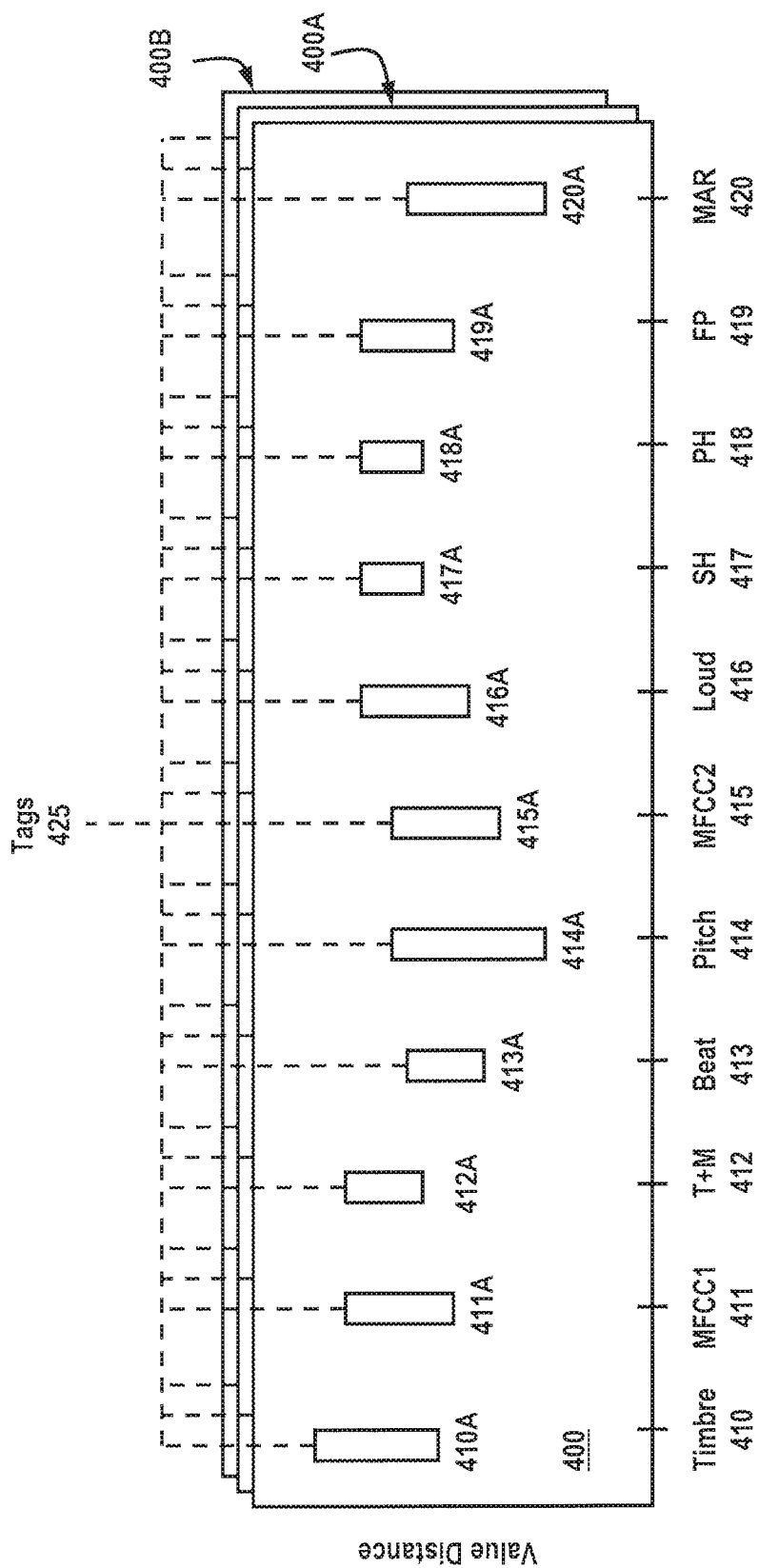
FIG. 4 illustrates an exemplary process for generating tags for use in audio template generation under yet another exemplary embodiment.

FIG. 4 provides an example of a tag arrangement comprising a plurality of extracted features along with a value distance/tolerance, where each feature value is expressed as a tolerable range for later comparison. Under one embodiment, each extracted audio feature is separately measured and collected as ranges (410A-420A) for template 400. Depending on the feature extracted, ranges may be combined, weighted, averaged and/or normalized for unit variance. Ranges are then set against value distances that are determined through any of Euclidean (e.g., 413A, 417A-419A), weighted Euclidean (e.g., 410A-412A, 414A), Kullback-Leibler distances (e.g., 415A, 416A) or others for tag creation/identification 425. In the example of FIG. 4, audio features relating to timbre 410 may include specific measurements directed to mean and variance of the spectral centroid, roll-off, flux, and or percentage of low/high energy frames. Timbre-related measurements may be taken across a plurality of audio signals to establish a set of ranges 410A for a particular tag (425). Subsequent measurements that are compared against these ranges (e.g., using weighted Euclidean distance), and which fall within the predetermined range, may be said to match a feature range for a particular tag. Additional features may include a first MFCC measurement 411, involving the mean and variance of a predetermined number of mel-frequency cepstral coefficients or number of dimensions (411A), and a concatenation of timbre and MFCC features 412, 412A.

Beat histogram features 413 may also be used to identify prominent beats, which may comprise amplitudes and periods of peaks in the histogram, a ratio between the peaks and the sum of all peaks 413A. Pitch 414 may be derived from a histogram of pitches in an audio signal 414A, which may include periods and amplitudes of prominent peaks on a full semitone scale and/or octave independent scale. Additional MFCCs 415 may be estimated from short audio frames, where a Gaussian Mixture Model (GMM) may be trained to model them 415A. Loudness 416 may be measured from the sone of frequency bands distributed on a Bark scale, where a GMM may be trained on the loudness values 416A. Spectral histogram 417 may be formed from a derivative of raw sone features, where the number of loudness levels exceeding a predetermined threshold in each frequency may be counted 417A. A Periodicity histogram 418 may measure periodic beats 418A, or a fluctuation pattern 419 may be used to measure periodicities in a signal 419A. It is understood that the examples of FIG. 4 are merely illustrative, and that other features/techniques described herein may be used for creating tags 425 for template 400. Additionally, other techniques such as a multivariate autoregressive model 420 may be used to capture temporal correlations of MFCCs over relatively short (e.g., 1-2 s) segments to produce feature vectors for each segment (420A). The vectors may be used individually or combined to compare for later comparison to new incoming audio features to identify audio features and characteristics.

Under a preferred embodiment, each of templates (400-400B) is comprised of one or more tags 425. In one embodiment, each tag is associated with a specific audio feature range (410A-420A). In another embodiment, each tag is associated with a plurality of audio feature ranges. For example, a tag relating to a genre, instrument or emotive descriptor may combine audio feature ranges from audio timbre (410A), beat (413A), loudness (416A) and spectral histogram (417A). In another example, the combined features may include audio timbre (410A), MFCC1 (411A), T+M (412A), and loudness (416A). In yet another example, combined features may include beat (413A) and periodicity histogram (418A). As can be appreciated by one skilled in the art, a large number of possibilities are available for developing and customizing tags for retrieval of semantic audio information/data.

Templates are preferably formed using a training process, where known audio signals are fed into a system such as the one illustrated in FIG. 2, and audio features are identified and tagged. For example, a collection of songs, known to be from a specific genre, have a certain number of audio features extracted, where audio feature ranges are determined for each template. The type and number of audio features used is not critical and may be left to the discretion of the designer. If more audio features are used, this will likely result in more accurate and/or granular semantic data. However, increasing the number of features increases the processing power needed to extract and tag audio features. As the features are extracted, they may joined to form ranges for features, and/or normalized or catenated to form one or more feature vectors that are subsequently tagged. Once the requisite features are tagged, they are formed as part of a template that is deemed representative of a specific genre (e.g., jazz, classical, rock, etc.). The same techniques may be used to form representative templates for instruments, emotive descriptors, etc. As each template is formed, it is stored in a database (e.g., SQL) for retrieval, processing and comparison to new incoming audio. These operations are preferably performed in a backoffice application (e.g., 108, 109) using Qt SQL libraries such as QSqlDatabase and QSqlQuery. The backoffice should also be usable with various engines, from a simple SQLite file to MySQL, PostgreSQL, Oracle, Access DB files or any DB supporting ODBC (Open Data Base Connectivity protocol).

One of the advantages of this configuration is that individual song-vs.-song comparison is not required, which can greatly reduce the database storage need. Instead of requiring thousands or millions of audio data features, databases may contain just a few hundred templates that are representative of a specific audio characteristic. Such a configuration greatly simplifies the data needed for obtaining semantic information on audio. Of course, these audio features may be further decreased or increased, depending on the granularity needed.

Figure 5:
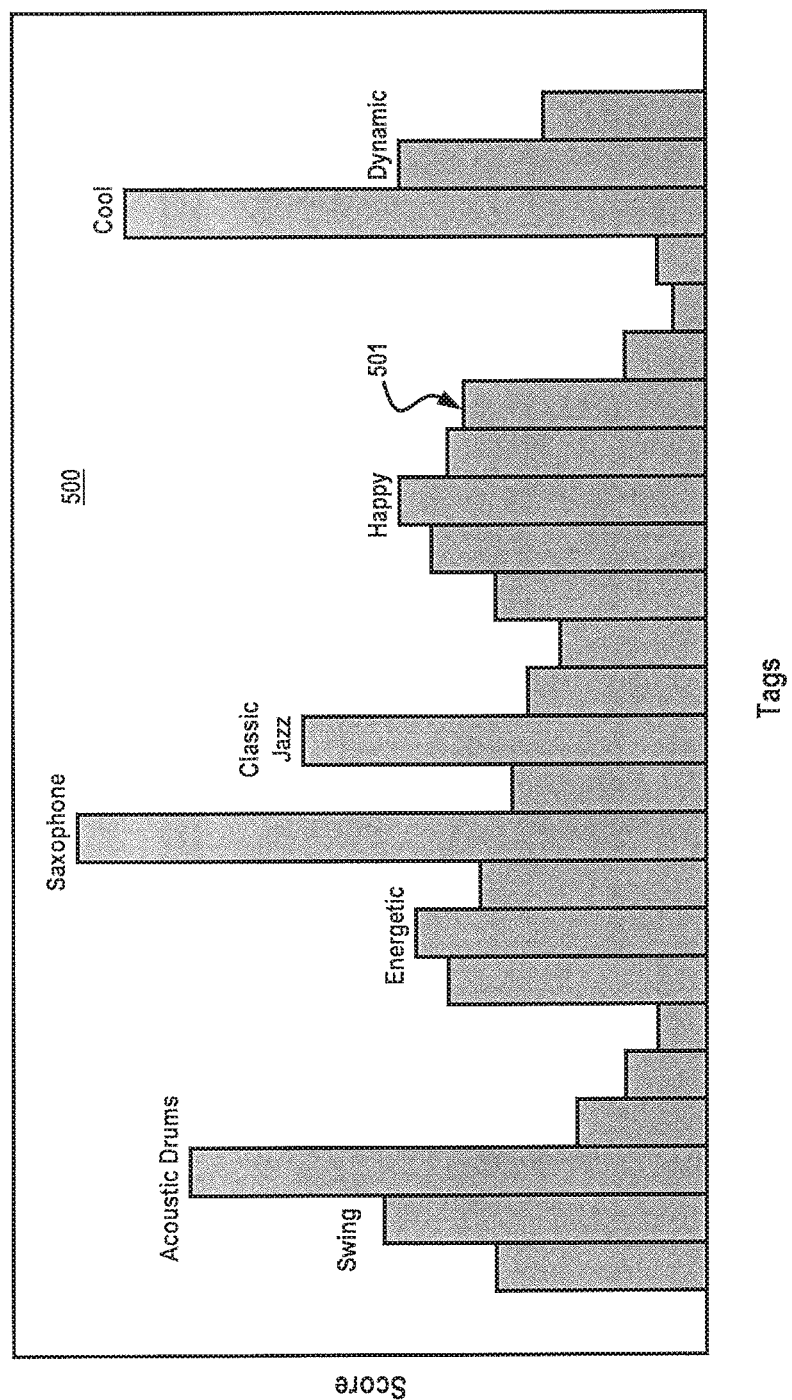
FIG. 5 illustrates an exemplary process for processing audio samples for comparison with audio templates to provide tag scores under yet another exemplary embodiment.

Turning to FIG. 5, an exemplary comparison result is illustrated for an incoming audio signal that is processed and compared to an audio template described above. When a new audio signal is received, it may be processed according to a process described below in FIG. 6, and the resulting semantic audio signature is compared to a previously stored temple created during a training process. As audio features are compared to templates, tagged audio features are identified and scored, and may further be aggregated into one or more score file histograms 500, were each file histogram 500 contains a score 501 relating to each respective feature. File 500 may consist of a single feature, or may contain a plurality of different features. In the example of FIG. 5, multiple features are contained in file 500, where features are related to various semantic information such as genre (classic jazz), instrumentation (acoustic drums, saxophone), style (swing), acoustical dynamics (dynamic, energetic) and emotive descriptors (happy). Again, the specific types and numbers of features are not critical and are left to the discretion of the designer. The resulting files are preferably time stamped and stored for later retrieval and processing FIG. 6 provides an example of new incoming audio (or test audio) received on a user device (e.g., 104-106), such as a cell phone, smart phone, personal computer, laptop, tablet, set-top-box, media box, and the like. The audio may be captured using a microphone that transduces the ambient audio into electrical form, or captured directly using a sound card, audio interface or the like. Incoming audio 601 is received and subjected to feature extraction 602 and feature integration 603, similar to the techniques described above in connection with FIG. 2. Depending on the device used, the number of extracted audio features may be increased or decreased, depending on the processing power and storage available. A semantic audio signature 604 is then formed from the extracted audio features, and stored on the user device. Under a preferred embodiment, the semantic audio signature is time stamped to indicate a time in which the signature was formed.

Semantic Signature 604 is then transmitted from the device via wired, wireless and/or cellular communication to a remote location, where the signature 604 is compared to audio templates 605, where tags are identified, scored and correlated. Under an alternate embodiment, the device may simply sample a time period of audio and transmit the sample via wired, wireless or cellular communication to a remote site for audio feature extraction, integration and semantic audio signature formation (604). Once tags are scored, they may be collected over a predetermined time period and processed for report generation. Unlike conventional audio signatures, semantic audio signatures may be taken over longer time intervals (e.g., 10-30 sec.), resulting in a saving of processing power.

FIGS. 7A and 7B illustrate a few examples of reports generated using the techniques described in FIG. 6. FIG. 7A illustrates a report 700 for a particular user ("User00001"), where one semantic feature is monitored. In this case, the user's device is monitored to determine the type and/or genre of audio or music that the user was listening to at given times. Here, it can be determined that the user began his morning at 9:20 AM listening to talk programming (e.g., talk radio, podcast, etc.), and at 9:26 AM began listening to classical music. At 10:20 AM, the user listened to jazz, followed by classic rock at 11:20 AM, and returning back to talk programming at 12:00 PM. At 2:00 PM the user then listened to hard rock. FIG. 7B illustrates an example where multiple semantic features were used for the content discussed in FIG. 7A. Here, in addition to genre-related information (talk, classical, jazz, classic rock, hard rock), other semantic features, including instrumentation (woodwinds, saxophone, electric guitar), style (Baroque, conversational, cool, swing, confrontational, distortion), acoustical dynamics (aggressive, energetic) and emotive descriptors (happy, brooding) may be included as well.

It can be appreciated by those skilled in the art that the semantic information extracted from audio may provide additional and valuable information regarding user listening habits. Such information would be particularly valuable to those engaged in the audience measurement business to determine generic listening habits of users or panelists. Additionally, the semantic information may be used to established "emotional profiles" for users and groups of users during the course of a day, week, month, year, etc. Demographic information may further be used to expand on these profiles to obtain demographically-related listening/ emotional information.

Various embodiments disclosed herein provide devices, systems and methods for performing various functions using an audience measurement system that includes audio beaconing. Although specific embodiments are described herein, those skilled in the art recognize that other embodiments may be substituted for the specific embodiments shown to achieve the same purpose. As an example, although terms like "portable" are used to describe different components, it is understood that other, fixed, devices may perform the same or equivalent functions. Also, while specific communication protocols are mentioned in this document, one skilled in the art would appreciate that other protocols may be used or substituted. This application covers any adaptations or variations of the present invention. Therefore, the present invention is limited only by the claims and all available equivalents.

The invention claimed is:

1. An apparatus to determine semantic audio information for audio, the apparatus comprising:
   memory including computer readable instructions; and
   a processor to execute the computer readable instructions to:
   extract a plurality of audio features from the audio, at least one of the plurality of audio features including at least one of a temporal feature, a spectral feature, a harmonic feature, or a rhythmic feature;
   compare the plurality of audio features to a plurality of stored audio feature ranges having tags associated therewith; and
   determine a set of ranges of the plurality of stored audio feature ranges having closest matches to the plurality of audio features, a tag associated with the set of ranges having the closest matches to be used to determine the semantic audio information for the audio, wherein the tag is associated with at least one of an audio timbre range, a beat range, a loudness range or a spectral histogram range.

2. The apparatus of claim 1, wherein the tag is associated with timber and the set of ranges includes a range for a mean of a spectral centroid, a range for a variance of the spectral centroid, and a range of a percentage of low/high energy frames.

3. The apparatus of claim 1, wherein the tag is associated with beat and the set of ranges includes a range for an amplitude of peaks in a beat histogram, a range for a periods of peaks in the beat histogram, and a range for a ratio between a peak and a sum of all peaks in the beat histogram.

4. The apparatus of claim 3, wherein the tag is associated with pitch and the set of ranges includes a range for an amplitude of prominent peaks in a pitch histogram, and a range for periods of peaks in the pitch histogram, wherein the pitch histogram is on a full semitone scale or an octave independent scale.

5. The apparatus of claim 1, wherein (1) the harmonic feature includes at least one of a pitch, a tonality, a pitch class profile, harmonic changes, a main pitch class, an octave range of dominant pitch, a main tonal interval relation, or an overall pitch strength of at least some of the audio, (2) the rhythmic feature includes at least one of a rhythmic structure, a beat period, a rhythmic fluctuation, or an average tempo for at least some of the audio, (3) the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio, and (4) the temporal feature includes at least one of amplitude, power, or zero crossing of at least some of the audio.

6. An article of manufacture comprising computer readable instructions that, when executed, cause a computing device to at least:

extract a plurality of audio features from the audio, at least one of the plurality of audio features including at least one of a temporal feature, a spectral feature, a harmonic feature, or a rhythmic feature;

compare the plurality of audio features to a plurality of stored audio feature ranges having tags associated therewith; and determine a set of ranges of the plurality of stored audio feature ranges having closest matches to the plurality of audio features, a tag associated with the set of ranges having the closest matches to be used to determine the semantic audio information for the audio, wherein the tag is associated with at least one of an audio timbre range, a beat range, a loudness range or a spectral histogram range.

7. The article of manufacture of claim 6, wherein the tag is associated with timber and the set of ranges includes a range for a mean of a spectral centroid, a range for a variance of the spectral centroid, and a range of a percentage of low/high energy frames.

8. The article of manufacture of claim 6, wherein the tag is associated with beat and the set of ranges includes a range for an amplitude of peaks in a beat histogram, a range for a periods of peaks in the beat histogram, and a range for a ratio between a peak and a sum of all peaks in the beat histogram.

9. The article of manufacture of claim 6, wherein the tag is associated with pitch and the set of ranges includes a range for an amplitude of prominent peaks in a pitch histogram, and a range for periods of peaks in the pitch histogram, wherein the pitch histogram is on a full semitone scale or an octave independent scale.

10. The article of manufacture of claim 6, wherein (1) the harmonic feature includes at least one of a pitch, a tonality, a pitch class profile, harmonic changes, a main pitch class, an octave range of dominant pitch, a main tonal interval relation, or an overall pitch strength of at least some of the audio, (2) the rhythmic feature includes at least one of a rhythmic structure, a beat period, a rhythmic fluctuation, or an average tempo for at least some of the audio, (3) the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio, and (4) the temporal feature includes at least one of amplitude, power, or zero crossing of at least some of the audio.

11. A method to determine semantic audio information for audio, the method comprising:

extracting, by executing an instruction with a processor, a plurality of audio features from the audio, at least one of the plurality of audio features including at least one of a temporal feature, a spectral feature, a harmonic feature, or a rhythmic feature;

comparing, by executing an instruction with the processor, the plurality of audio features to a plurality of stored audio feature ranges having tags associated therewith; and determining, by executing an instruction with the processor, a set of ranges of the plurality of stored audio feature ranges having closest matches to the plurality of audio features, a tag associated with the set of ranges having the closest matches to be used to determine the semantic audio information for the audio, wherein the tag is associated with at least one of an audio timbre range, a beat range, a loudness range or a spectral histogram range.

12. The method of claim 11, wherein the tag is associated with timber and the set of ranges includes a range for a mean of a spectral centroid, a range for a variance of the spectral centroid, and a range of a percentage of low/high energy frames.

13. The method of claim 11, wherein the tag is associated with beat and the set of ranges includes a range for an amplitude of peaks in a beat histogram, a range for a periods of peaks in the beat histogram, and a range for a ratio between a peak and a sum of all peaks in the beat histogram.

14. The method of claim 11, wherein the tag is associated with pitch and the set of ranges includes a range for an amplitude of prominent peaks in a pitch histogram, and a range for periods of peaks in the pitch histogram, wherein the pitch histogram is on a full semitone scale or an octave independent scale.

15. The method of claim 11, wherein (1) the harmonic feature includes at least one of a pitch, a tonality, a pitch class profile, harmonic changes, a main pitch class, an octave range of dominant pitch, a main tonal interval relation, or an overall pitch strength of at least some of the audio, (2) the rhythmic feature includes at least one of a rhythmic structure, a beat period, a rhythmic fluctuation, or an average tempo for at least some of the audio, (3) the spectral feature includes at least one of a spectral centroid, a spectral rolloff, a spectral flux, a spectral flatness measure, a spectral crest factor, Mel-frequency cepstral coefficients, Daubechies wavelet coefficients, a spectral dissonance, a spectral irregularity, or a spectral inharmonicity of at least some of the audio, and (4) the temporal feature includes at least one of amplitude, power, or zero crossing of at least some of the audio.

* * * * *